(12) United States Patent
Kyllonen

(10) Patent No.: US 11,423,240 B1
(45) Date of Patent: Aug. 23, 2022

(54) RF TRANSPONDER PROVIDING TWO-WAY ENGAGEMENT SIGNALING AND FLEXIBLE SUBSTRATE HAVING ATTACHMENT FEATURES

(71) Applicant: AUTOMATED ASSEMBLY CORPORATION, Lakeville, MN (US)

(72) Inventor: Kimmo Kyllonen, Shakopee, MN (US)

(73) Assignee: AUTOMATED ASSEMBLY CORPORATION, Lakeville, MN (US)

( * ) Notice: Subject to any disclaimer, the term of this patent is extended or adjusted under 35 U.S.C. 154(b) by 0 days.

(21) Appl. No.: 17/116,485

(22) Filed: Dec. 9, 2020

Related U.S. Application Data

(60) Provisional application No. 62/947,346, filed on Dec. 12, 2019.

(51) Int. Cl.
    *G06K 7/10*     (2006.01)
    *G06K 19/07*     (2006.01)

(52) U.S. Cl.
    CPC ..... *G06K 7/10366* (2013.01); *G06K 19/0723* (2013.01)

(58) Field of Classification Search
    CPC .................. G06K 7/10366; G06K 19/0723
    USPC .............................................. 235/451
    See application file for complete search history.

(56) References Cited

U.S. PATENT DOCUMENTS

| | | | |
|---|---|---|---|
| 9,582,746 B2 | 2/2017 | Mullis et al. | |
| 9,996,718 B2 | 6/2018 | Vogel et al. | |
| 10,117,080 B2 | 10/2018 | Wilkinson | |
| 2008/0133022 A1* | 6/2008 | Caylor | A61B 5/6846 623/22.28 |
| 2018/0198410 A1* | 7/2018 | Groe | H03L 7/099 |
| 2020/0140163 A1* | 5/2020 | Novak | B65D 85/10 |
| 2020/0143219 A1* | 5/2020 | Nyalamadugu | G06K 19/07775 |
| 2020/0161742 A1* | 5/2020 | Leitermann | G06Q 10/087 |
| 2020/0217721 A1* | 7/2020 | Ankney | G06K 19/0717 |
| 2020/0327782 A1* | 10/2020 | Wong | G07G 1/0063 |
| 2020/0328509 A1* | 10/2020 | Shiao | H04B 7/0837 |
| 2020/0356735 A1* | 11/2020 | Wilkinson | G06K 19/07749 |
| 2021/0085428 A1* | 3/2021 | Yavari | A61B 90/98 |

FOREIGN PATENT DOCUMENTS

WO    WO2017118676 A1 * 7/2017

OTHER PUBLICATIONS

U.S. Appl. No. 16/672,894, filed Nov. 4, 2019, and entitled: "Multi-part RF Transponder and Multi-way Engagement Signaling". The Examiner is referred to the copending patent prosecution of the common Application (no attachment).

\* cited by examiner

*Primary Examiner* — Allyson N Trail
(74) *Attorney, Agent, or Firm* — Crawford Maunu PLLC

(57) ABSTRACT

A transponder arrangement includes a flexible substrate having a first portion configured to engage a first structure and a second portion configured to engage a second structure, and a transponder integrated circuit (IC). Detection wiring is disposed on the first portion of the flexible substrate and coupled to the transponder IC, and an antenna disposed on the second portion of the flexible substrate and coupled to the transponder IC. The transponder IC is configured to generate an RF data signal that encodes different data values in response to the antenna resonating and different electricity levels on the detection wiring.

33 Claims, 3 Drawing Sheets

RF TRANSPONDER PROVIDING TWO-WAY ENGAGEMENT SIGNALING AND FLEXIBLE SUBSTRATE HAVING ATTACHMENT FEATURES

TECHNICAL FIELD

The disclosure generally relates to radio-frequency transponder arrangements indicating engagement between structures.

BACKGROUND

Some applications require verification of proper alignment, engagement, or latching between two parts. Such desired positioning of the parts may be necessary to ensure correct operation of an apparatus or prevent unexpected separation of the two parts. Examples abound in areas, including, but not limited to construction, manufacturing, communications, medical treatment, mining, etc.

SUMMARY

The disclosed structure of an RF transponder can be used to signal proper engagement between two structures. The RF transponder can generate different codes depending on whether or not the two structures are properly engaged.

The parts of the transponder arrangement are disposed on a flexible substrate, and the shape of the flexible substrate enables attachment to one or both of the two structures. The flexible substrate has integral features for engaging one or both of the two structures without the need for adhesives or other supplemental attachment mechanisms.

The transponder arrangement includes a semiconductor transceiver integrated circuit connected to an antenna and to a detection loop. When the transponder arrangement is attached to one or both of the structures and the structures are properly engaged, the detection loop is severed. If the structures are not properly engaged, the detection loop remains intact. The transceiver IC, when activated by an RFID reader, generates a first code if the detection loop is severed or generates a second code if the detection loop is intact.

In another embodiment, the transponder arrangement includes a semiconductor transceiver integrated circuit connected to an antenna and to a pair of wires. When the transponder arrangement is attached to one or both of the structures and the structures are properly engaged, an expected level of electric coupling between the pair of wires is present. If the structures are not properly engaged, the expected level of electrical coupling is absent. The transceiver IC, when activated by an RFID reader, generates a first code if the expected level of electrical coupling is present or generates a second code if the expected level of electrical coupling is absent.

In another embodiment, the transponder arrangement includes a semiconductor transceiver integrated circuit connected to an antenna and to a pair of wires, and a switch can connect or disconnect the wires when the structures are properly engaged. In one approach, when the transponder arrangement is attached to one or both of the structures and the structures are properly engaged, the switch closes and connects the pair of wires, and if the structures are not properly engaged, the switch remains open. In another approach, when the transponder arrangement is attached to one or both of the structures and the structures are properly engaged, the switch opens and disconnects the pair of wires, and if the structures are not properly engaged, the switch remains closed. The transceiver IC, when activated by an RFID reader, generates a first code if the switch is closed or generates a second code if the switch is open.

The structure of the RF transponder can be adapted to various applications. For example, in some applications, the structures to be engaged may be inaccessible, hidden from view, or too small to permit visual or manual verification of the desired engagement.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

Figure 1:
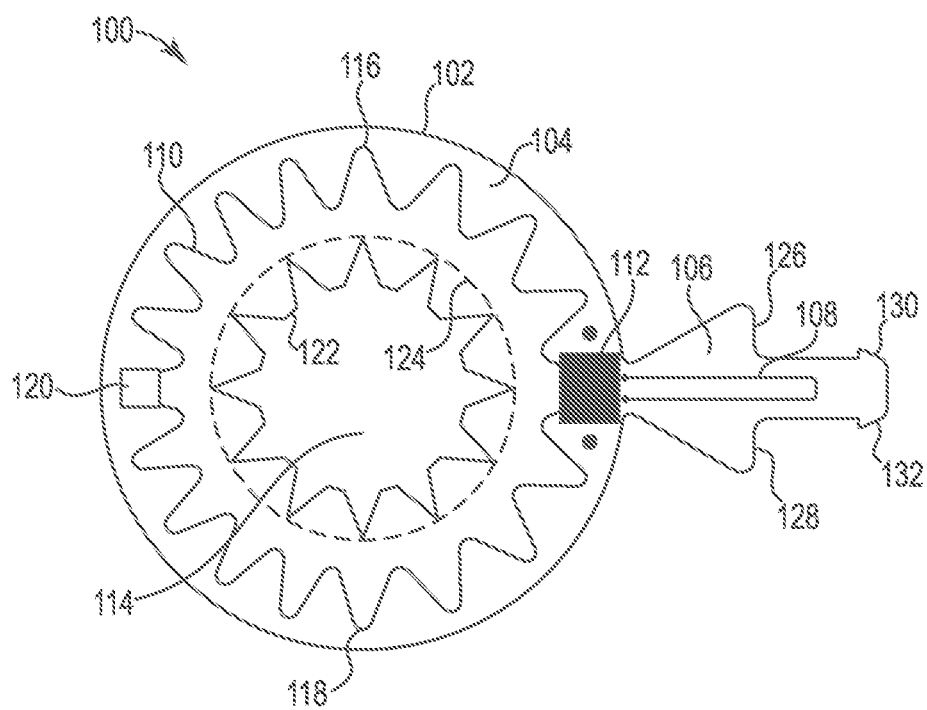
FIG. 1 shows an exemplary transponder arrangement that can be employed to detect and indicate engagement between two or more structures.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Terms such as over, under, top, bottom, above, below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The disclosed methods and structures can be especially beneficial in applications such as manufacturing, repair, maintenance, monitoring, etc. in which the number of structures needing verification of suitable engagement is too numerous for manual verification or visual inspection is too difficult. In addition, automated assembly lines can benefit from automated verification of proper assembly.

The disclosed structure of an RF transponder arrangement/apparatus can be used to signal different levels of engagement between multiple structures. The engagement between structures can be temporary or permanent depending on the application. Temporary engagement refers to applications in which the structures can be engaged, disengaged, and re-engaged without destroying the structures. Permanent engagement refers to applications in which the structures are joined and cannot be disengaged without destroying the structures. Engagement can be by latching, clamping, locking, adhering, etc., for example.

Structures that can benefit from the ability to detect engagement can include all types, including without limitation, electrical connectors, pneumatic connectors, hydraulic connectors, mechanical connectors, latches, hubs, clamps, hinges, cams, sleeves, collars, hoses, gears, etc. The number of different structures is innumerable and is limited only by the number of different applications requiring particular engagement between two or more structures.

FIG. 1 shows an exemplary transponder arrangement 100 that can be employed to detect and indicate engagement between two or more structures (not shown). The transponder arrangement 100 includes a flexible substrate 102 having an annular portion 104 and a detection portion 106. The detection portion of the flexible substrate is connected to the annular portion at an outside perimeter of the annulus.

A detection loop 108 is disposed on the detection portion 106 of the flexible substrate, and an antenna 110 disposed on the annular portion 104 of the flexible substrate. A transponder integrated circuit (IC) 112 is attached to the flexible substrate, either on the annular portion or on the detection portion. In the exemplary arrangement, the transponder IC is attached to the annular portion. The antenna and the detection loop are both electrically connected to respective pins of the transponder IC.

The transponder IC 112 can generate different RF data signals based on the level of engagement of the intended structures. The annular portion 104 of the arrangement can be attached to a first structure, and proper engagement of the first structure with a second structure can be indicated by positioning the detection loop 108 relative to the second structure. According to one approach, the second structure can have a cutter that would sever the detection loop upon proper engagement between the first and second structures and render the detection loop non-conductive.

In response to an RFID reader (not shown) causing the antenna 110 to resonate and absence of current flow in the detection loop 108, the transponder IC 112 can generate an RF data signal that encodes a first data value indicating proper engagement of the structures. In response to an RFID reader causing the antenna 110 to resonate and presence of current flow in the detection loop 108, the transponder IC can generate an RF data signal that encodes a second data value indicating disengagement or improper engagement.

The antenna 110, which can be a meandering dipole antenna, is disposed around a void 114 of the annular portion 104. The antenna includes a first arm 116 and a second arm 118. The first arm extends part way around the annulus, and the second arm extends part way around the annulus opposite the first arm. A meandering dipole pattern can reduce the outer diameter of the antenna size of the annular portion 104 of the substrate. An interdigital capacitor 120 can be connected between ends of arms of the dipole antenna if a reduction in the resonant frequency is desired.

The flexible substrate 102 has features that enable attachment to or engagement with the structures between which the arrangement 100 can indicate proper engagement. For example, for indicating proper engagement between a first structure (not shown) and a second structure (not shown), the features of the flexible substrate enable attachment to the first structure and to the second structure.

Features of the annular portion 104 are configured for attachment/engagement with a first structure. The flexible substrate 102 can have fingers 122 extending from the inside edge 124 of the annular portion 104 extend into the void 114 of the annular portion. The void and fingers allow attachment of the transponder arrangement 100 to a tube or tubular portion of a structure. The tube (not shown), which can have an outside diameter approximately equal to the diameter of the void, can be inserted through the void, and the fingers provide a pressure fit of the arrangement to the tube. RF-performance can be improved by the fingers offsetting the antenna 110 from the tube if the tube is electrically conductive.

The detection portion 106 of the flexible substrate 102 can have shoulders 126 and 128. The detection portion can be inserted into an opening of a second structure (not shown), and the shoulders can prevent the tag from being inserted more than desired into the opening. The shoulders thereby limit engagement of the detection portion with the first structure to partial insertion of the first portion into the opening. The detection portion 106 of the flexible substrate 102 can also have locking features 130 and 132 that prevent or inhibit the portion of the flexible substrate from separating from the second structure once inserted.

The transponder IC 112 can include logic circuitry (not shown) and/or a microcontroller that implements application logic, memory circuits (not shown) for storage of data to be collected and/or conveyed in response to a signal from an RFID reader, and RF transceiver circuitry (not shown). The transponder IC can be a bare die or a packaged device depending on application requirements. In some applications, the packaged device can include a battery to power the circuitry for logging data gathered by a microcontroller or other circuitry. The logged data can be read by an RFID reader.

The materials and construction of the antenna 116 and detection loop 108 can vary according to application requirements. The antenna and detection loop can be printed-and-etched or stamped foil, for example. In an alternative approach, the materials selected for the substrate and the wiring of the antenna and detection loop can provide a clean, economical, and reliable structure. Instead of printing and/or etching an electrically conductive pattern, a fine-gauge wire can be attached to a suitable substrate by an adhesive layer. A wide variety of substrates may be suitable as there is no need for the substrate to withstand the harsh chemicals involved in print-and-etch processes. For some embodiments, the substrate can be a flexible substrate, such as paper or some other dielectric layer.

In one embodiment, the dipole antenna and detection loop can be constructed using a fine gauge bare wire. For example, 44 gauge (AWG) copper wire has been found to be suitable for some implementations. Aluminum may be suitable for other applications. Different gauges may be suitable for different applications. The wire can be glued to the surface of a substrate by a polymer adhesive. In one embodiment, the adhesive is pressure sensitive, which keeps the wire in place as the conductive pattern is formed on the substrate. Relative to a printed and/or etched conductor, the fine-gauge wiring can better maintain its integrity.

The wire can be bare or insulated wire and made of any material suitable for the application. It will be appreciated that "round wire" as used herein does not refer to printed or printed and/or etched patterns of conductive material. Rather, as used herein, round wire refers to one or more strands of conductive material having a circular cross-section and that can be made, for example, by drawing the conductive material through draw plates. In other applications, the dipole antenna can be constructed by print-and-etching, printing conductive ink, or stamping conductive foil, for example.

Figure 2:
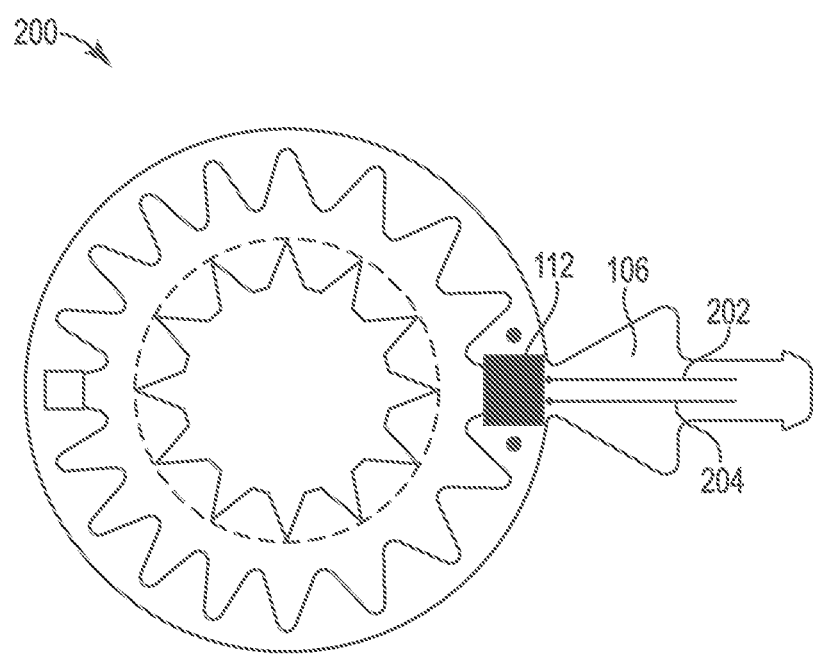
FIG. 2 shows an exemplary transponder arrangement that can be employed to detect and indicate engagement between two or more structures.

FIG. 2 shows an exemplary transponder arrangement 200 that can be employed to detect and indicate engagement between two or more structures (not shown). The elements of transponder arrangement 200 are the same as the elements of the transponder arrangement 100 of FIG. 1, with the exception of the detection loop 108 of transponder arrangement 100 of FIG. 1. Instead of the detection loop of the transponder arrangement of FIG. 1, the transponder arrangement 200 of FIG. 2 has a pair of wires 202 and 204 electrically coupled to the transponder IC 112. The ends of the wires opposite the connections to the transponder IC are electrically disconnected from one another.

Different levels of electrical coupling between the wires 202 and 204 can be used to indicate levels of engagement between two structures. Instead severing the detection loop 108 of transponder arrangement 100 upon proper engagement between structures, the structure with which the detection portion 106 and wires 202 and 204 is engaged can have structure and characteristics that produce different levels of electrical coupling between the wires depending on the relative positions of the wires and the structure.

In a first level of engagement between the structures, an expected level of electrical coupling between the pair of wires is not present. The expected level of electrical coupling can be any level suitable for the application and can be detected based on voltage or current level carried across the wires. In a second level of engagement between the structures, an expected level of electrical coupling between the pair of wires is present. The expected level of electrical coupling can result from the wires contacting an electrically conductive element or a change in capacitance resulting from the wires contacting a non-conductor. The transponder IC can generate different codes in response to different levels of electrical coupling between the pair of wires, and the different codes can indicate different levels of engagement.

Figure 3:
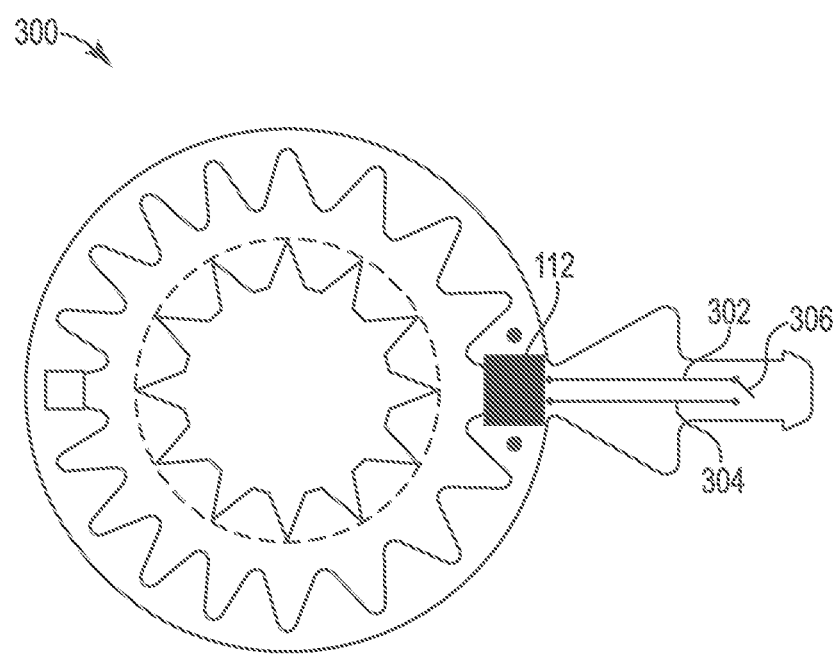
FIG. 3 shows an exemplary transponder arrangement that can be employed to detect and indicate engagement between two or more structures.

FIG. 3 shows an exemplary transponder arrangement 300 that can be employed to detect and indicate engagement between two or more structures (not shown). The elements of transponder arrangement 300 are the same as the elements of the transponder arrangement 100 of FIG. 1, with the exception of the detection loop 108 of transponder arrangement 100 of FIG. 1. Instead of the detection loop of the transponder arrangement of FIG. 1, the transponder arrangement 300 has a pair of wires 302 and 304 electrically coupled to the transponder IC 112. A switch 306 is connected to the ends of the wires.

In one embodiment, proper engagement of the structures causes the switch to close and complete a conductive loop with the pair of wires, and the switch remains open when the structures are improperly engaged. In an alternative embodiment, proper engagement of the structures causes the switch to open and disconnect a conductive loop involving the pair of wires, and the switch remains closed when the structures are improperly engaged. The transponder IC can generate different codes in response to the switch being closed or open, and the different codes can indicate different levels of engagement between the structures.

Though aspects and features may in some cases be described in individual figures, it will be appreciated that features from one figure can be combined with features of another figure even though the combination is not explicitly shown or explicitly described as a combination.

The present invention is thought to be applicable to a variety of applications. Other aspects and embodiments will be apparent to those skilled in the art from consideration of the specification and practice of the circuits and methods disclosed herein. It is intended that the specification and illustrated embodiments be considered as examples only, with a true scope of the invention being indicated by the following claims.

What is claimed is:

1. A transponder arrangement, comprising:
   a flexible substrate having a first portion configured to engage a first structure and a second portion configured to engage a second structure, wherein the first portion has a latch portion configured to allow insertion of the first portion into an opening of the first structure for engagement and to inhibit disengagement of the first portion from the first structure once engaged;
   a transponder integrated circuit (IC);
   a detection loop disposed on the first portion of the flexible substrate and coupled to the transponder IC;
   an antenna disposed on the second portion of the flexible substrate and coupled to the transponder IC, wherein:
   the transponder IC is configured to generate an RF data signal that encodes a first data value in response to the antenna resonating and absence of current flow in the detection loop; and
   the transponder IC is configured to generate an RF data signal that encodes a second data value in response to the antenna resonating and presence of current flow in the detection loop.

2. The transponder arrangement of claim 1, wherein the second portion forms an annulus and the antenna is disposed around a void of the annulus.

3. The transponder arrangement of claim 2, wherein the second portion has fingers extending from an edge of the annulus into the void and configured to engage the second structure.

4. The transponder arrangement of claim 1, wherein the antenna is a dipole antenna.

5. The transponder arrangement of claim 4, wherein the antenna is a meandering dipole antenna.

6. The transponder arrangement of claim 4, wherein:
   the second portion forms an annulus;
   the antenna includes a first arm and a second arm, the first arm extends part way around the annulus, and the second arm extends part way around the annulus opposite the first arm.

7. The transponder arrangement of claim 6, further comprising an interdigital capacitor is coupled between ends of the first arm and second arm.

8. The transponder arrangement of claim 6, wherein the first portion of the flexible substrate is connected to the second portion at an outside perimeter of the annulus.

9. The transponder arrangement of claim 8, wherein the first portion has shoulder portions that limit engagement of the first portion with the first structure to partial insertion of the first portion into an opening of the first structure.

10. The transponder arrangement of claim 1, wherein the antenna comprises round wire.

11. The transponder arrangement of claim 1, wherein the detection loop comprises round wire.

12. A transponder arrangement, comprising:
   a flexible substrate having a first portion configured to engage a first structure and a second portion configured to engage a second structure, wherein the first portion has a latch portion configured to allow insertion of the first portion into an opening of the first structure for engagement and to inhibit disengagement of the first portion from the first structure once engaged;
   a transponder integrated circuit (IC);
   a first wire and a second wire disposed on the flexible substrate and having respective ends coupled to pins of the transponder IC and having portions configured for different levels of electrical coupling between the first wire and second wire;

an antenna disposed on the second portion of the flexible substrate and coupled to the transponder IC, wherein:

the transponder IC is configured to generate an RF data signal that encodes a first data value in response to the antenna resonating and a first level of electrical coupling between the first wire and the second wire; and the transponder IC is configured to generate an RF data signal that encodes a second data value in response to the antenna resonating and a second level of electrical coupling between the first wire and the second wire.

13. The transponder arrangement of claim 12, wherein the second portion forms an annulus and the antenna is disposed around a void of the annulus.

14. The transponder arrangement of claim 13, wherein the second portion has fingers extending from an edge of the annulus into the void and configured to engage the second structure.

15. The transponder arrangement of claim 12, wherein the antenna is a dipole antenna.

16. The transponder arrangement of claim 15, wherein the antenna is a meandering dipole antenna.

17. The transponder arrangement of claim 15, wherein:
the second portion forms an annulus;
the antenna includes a first arm and a second arm, the first arm extends part way around the annulus, and the second arm extends part way around the annulus opposite the first arm.

18. The transponder arrangement of claim 17, further comprising an interdigital capacitor is coupled between ends of the first arm and second arm.

19. The transponder arrangement of claim 17, wherein the first portion of the flexible substrate is connected to the second portion at an outside perimeter of the annulus.

20. The transponder arrangement of claim 19, wherein the first portion has shoulder portions that limit engagement of the first portion with the first structure to partial insertion of the first portion into an opening of the first structure.

21. The transponder arrangement of claim 12, wherein the antenna comprises round wire.

22. The transponder arrangement of claim 12, wherein the detection loop comprises round wire.

23. A transponder arrangement, comprising:
a flexible substrate having a first portion configured to engage a first structure and a second portion configured to engage a second structure, wherein the first portion has a latch portion configured to allow insertion of the first portion into an opening of the first structure for engagement and to inhibit disengagement of the first portion from the first structure once engaged;

a transponder integrated circuit (IC);

a first wire and a second wire disposed on the flexible substrate and having respective ends coupled to pins of the transponder IC;

a switch coupled between the first wire and the second wire, wherein the switch is configured to close in response to engagement of the first structure and the second structure;

an antenna disposed on the second portion of the flexible substrate and coupled to the transponder IC, wherein:

the transponder IC is configured to generate an RF data signal that encodes a first data value in response to the antenna resonating and the switch being closed; and the transponder IC is configured to generate an RF data signal that encodes a second data value in response to the antenna resonating and the switch being open.

24. The transponder arrangement of claim 23, wherein the second portion forms an annulus and the antenna is disposed around a void of the annulus.

25. The transponder arrangement of claim 24, wherein the second portion has fingers extending from an edge of the annulus into the void and configured to engage the second structure.

26. The transponder arrangement of claim 23, wherein the antenna is a dipole antenna.

27. The transponder arrangement of claim 26, wherein the antenna is a meandering dipole antenna.

28. The transponder arrangement of claim 26, wherein:
the second portion forms an annulus;
the antenna includes a first arm and a second arm, the first arm extends part way around the annulus, and the second arm extends part way around the annulus opposite the first arm.

29. The transponder arrangement of claim 28, further comprising an interdigital capacitor is coupled between ends of the first arm and second arm.

30. The transponder arrangement of claim 28, wherein the first portion of the flexible substrate is connected to the second portion at an outside perimeter of the annulus.

31. The transponder arrangement of claim 30, wherein the first portion has shoulder portions that limit engagement of the first portion with the first structure to partial insertion of the first portion into an opening of the first structure.

32. The transponder arrangement of claim 23, wherein the antenna comprises round wire.

33. The transponder arrangement of claim 23, wherein the detection loop comprises round wire.

* * * * *